United States Patent
Nakamura

(10) Patent No.: US 6,941,714 B2
(45) Date of Patent: Sep. 13, 2005

(54) GROMMET

(75) Inventor: Mamiko Nakamura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/197,534

(22) Filed: Jul. 18, 2002

(65) Prior Publication Data

US 2003/0014924 A1 Jan. 23, 2003

(30) Foreign Application Priority Data

Jul. 18, 2001 (JP) .................................... P2001-217985

(51) Int. Cl.[7] ............................................. H01B 17/26
(52) U.S. Cl. ..................... 52/395; 52/220.08; 52/220.1; 277/602
(58) Field of Search ............................ 52/220.8, 220.1, 52/395; 277/314, 602, 626, 606

(56) References Cited

U.S. PATENT DOCUMENTS

| | | | | |
|---|---|---|---|---|
| 4,945,193 A | * | 7/1990 | Oikawa et al. | 174/153 G |
| 4,959,509 A | * | 9/1990 | Takeuchi et al. | 277/606 |
| 5,029,879 A | * | 7/1991 | Strang et al. | 277/606 |
| 5,390,465 A | * | 2/1995 | Rajecki | 52/741.3 |
| 5,662,095 A | * | 9/1997 | Matsuo | 123/143 C |
| 6,402,155 B2 | * | 6/2002 | Sakata | 277/314 |

FOREIGN PATENT DOCUMENTS

JP 2001-23463 1/2001

* cited by examiner

*Primary Examiner*—Carl D. Friedman
*Assistant Examiner*—Basil Katcheves
(74) *Attorney, Agent, or Firm*—Oblon, Spivak, McClelland, Maier & Neustadt, P.C.

(57) ABSTRACT

A grommet which includes a first tubular portion holding a wire therein; a flange formed on a front part of the first tubular portion; a second tubular portion extending frontward from the flange; a flexible front portion extending from a front part of the second tubular portion in a shape converging frontward; a lip portion formed on a rear part of the second tubular portion; and a third tubular portion extending frontward from the front portion. As the grommet is fitted in a panel hole with an annular groove on its inner circumference, the lip portion comes into contact with a panel face to define a first annular space cooperating with the rear part of the second tubular portion and the panel face, and the front portion comes into contact with a rearward facing part of an annular groove surface to define a second annular space cooperating with the annular groove surface.

10 Claims, 3 Drawing Sheets

GROMMET

BACKGROUND OF THE INVENTION

1. Field of the Invention

The present invention relates to a grommet excellent in sound insulation, which is fitted in a hole of a panel of a vehicle or the like to allow a wire harness to be inserted therethrough.

2. Description of the Related Art

Japanese Patent application Laid-open No. 2001-23463 discloses a grommet having a small-diameter tubular portion, a tapered portion and a large-diameter tubular portion.

It is, however, not simple to attach this grommet to a panel with a sound insulating material thereon. A sound insulating material abutment portion of the grommet needs to be deformed inward when the large-diameter tubular portion thereof is inserted into a panel hole. And, the grommet needs to be pulled back to fit a fitting groove of the large-diameter tubular portion in the panel hole. Then, an outer periphery of the sound insulating material abutment portion needs to be pressed to the sound insulating material to define a sealed air space.

Moreover, since only one sealed air space is defined, this grommet has a limitation in sound insulation.

SUMMARY OF THE INVENTION

The object of the present invention is to provide a grommet excellent in sound insulation allowing easy attachment to a panel.

An aspect of the present invention is a grommet to be fitted in a panel hole of a panel with a insulation material thereon, the panel provided with an annular groove on an inner circumference of the panel hole, the grommet comprising: a first tubular portion holding a wire therein; a flange formed on a front part of the first tubular portion; a second tubular portion extending frontward from the flange, the second tubular portion to be fitted in the panel hole; a flexible front portion extending from a front part of the second tubular portion in a shape converging frontward; a lip portion formed on a rear part of the second tubular portion: and a third tubular portion extending frontward from the front portion, wherein, as the grommet is fitted in the panel hole, the lip portion comes into contact with a panel face to define a first annular space cooperating with the rear part of the second tubular portion and the panel face, and the front portion comes into contact with a rearward facing part of an annular groove surface to define a second annular space cooperating with the annular groove surface.

According to the aspect constituted as described above, since the front portion is flexible and in a shape converging frontward, the grommet can be easily fitted in the panel hole simply by pressing the front portion thereof into the panel hole. As the grommet is fitted in the panel hole, the lip portion is brought into contact with the panel face, and the front portion is brought into contact with the rearward facing part of the annular groove surface. The lip portion, the rear part of the second tubular portion, and the panel face cooperate to define the first annular space. The front portion and the annular groove surface cooperate to define the second annular space. Owing to these two annular spaces, the grommet is excellent in sound insulation.

BRIEF DESCRIPTION OF THE DRAWINGS

The invention will now be described with reference to the accompanying drawings, wherein.

DETAILED DESCRIPTION OF THE PREFERRED EMBODIMENT

Figure 1:
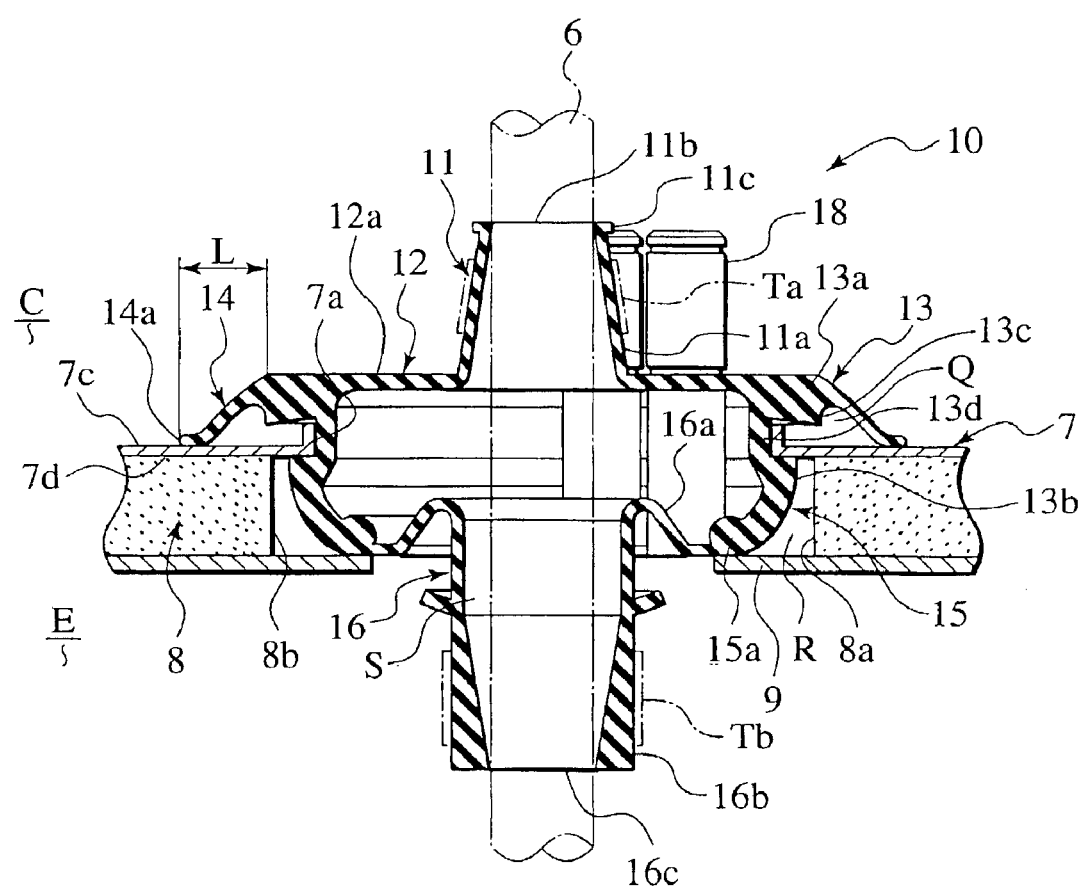
FIG. 1 is a sectional view of a grommet of an embodiment according to the present invention showing a state where the grommet is attached to a panel.

An embodiment of the present invention will be explained below with reference to the drawings, wherein like members are designated by like reference characters.

Figure 2:
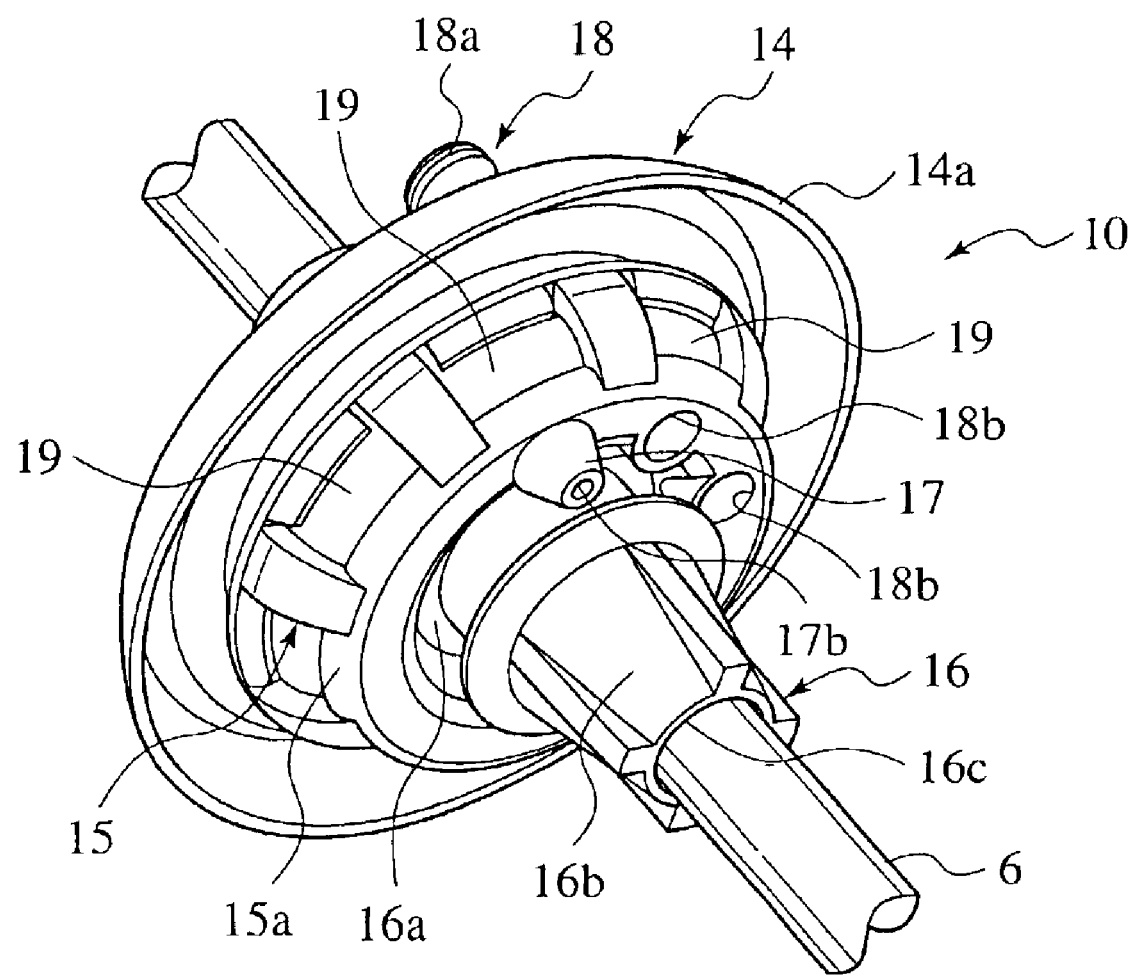
FIG. 2 is a perspective view of the grommet of FIG. 1.
Figure 3:
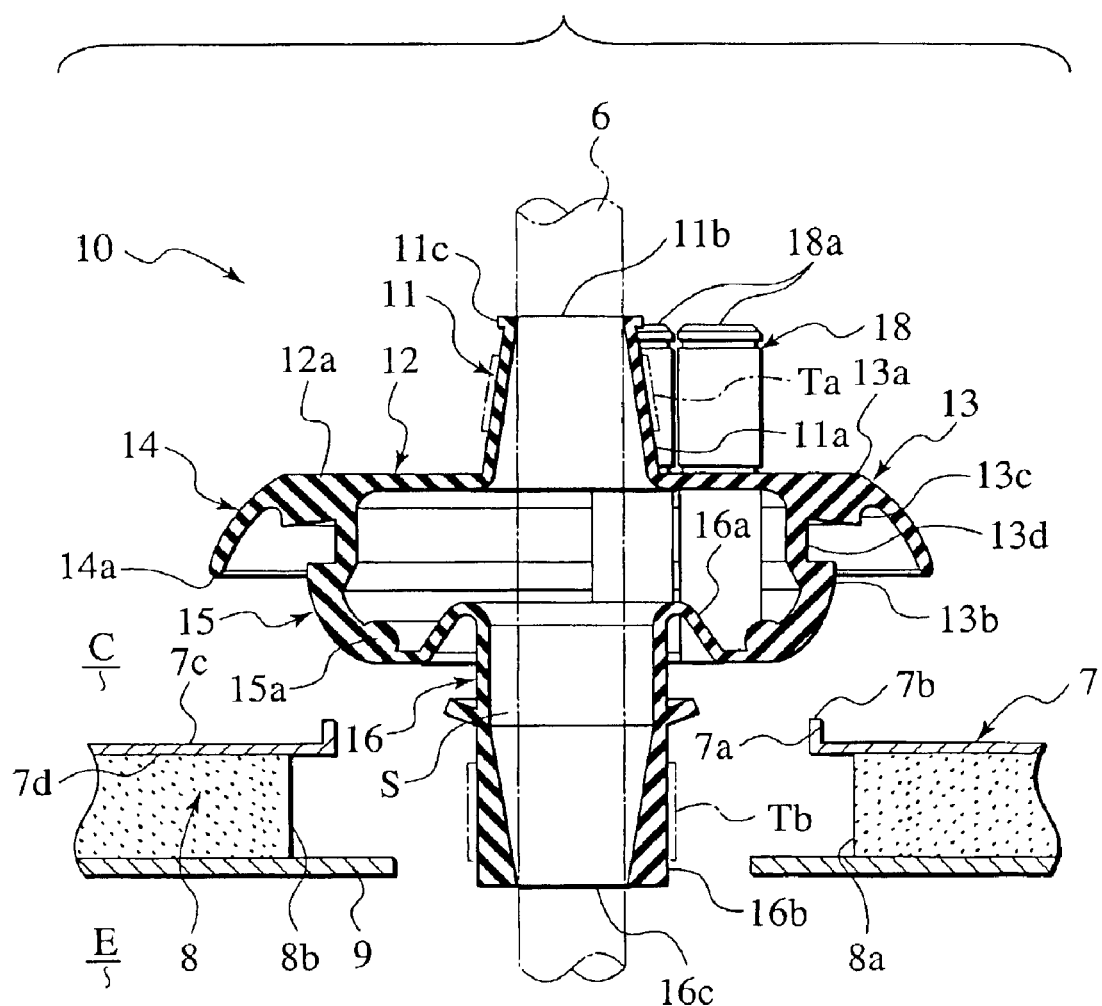
FIG. 3 is a sectional view of the grommet of FIG. 1 showing a state before attachment.

As shown in FIGS. 1 to 3, a grommet 10 includes a small-diameter tubular portion 11 (first tubular portion), a flange 12, a large-diameter tubular portion 13 (second tubular portion), a lip portion 14 as sound insulating membrane portion, a flexible front portion 15, a sound insulating membrane 16 (third tubular portion), a plurality of spare tubular portions 17 and 18 for options. The small-diameter tubular portion 1 has a thin wall cylindrical shape holding a wire harness 6 (wire) inserted therein. The flange 12 is integrally formed so as to be extended outward from a front part 11a of the small-diameter tubular portion 11 in an annular plate shape perpendicular to the wire harness 6. The large-diameter tubular portion 13 has a substantially cylindrical shape with a thick wall integrally formed so as to be extended frontward from an outer rim 12a of the flange 12 parallel to the wire harness 6. The lip portion 14 is integrally formed so as to be extended outward from a rear part 13a of the large-diameter tubular portion 13, and serves as a waterproof membrane closely contacting a rear face 7c of a panel board 7. The flexible front portion 15 is integrally formed so as to be extended frontward from a front part 13b of the large-diameter tubular portion 13 to an opening 8a of a sound insulating material 8. The sound insulating material 8 is superimposed on a front face 7d of the panel board 7 and has a skin 9 superimposed thereon. The opening 8a, a rearward facing part of the skin 9 and the front face 7d of the panel 7 define a surface of an annular groove provided on an inner circumference of a panel hole through the panel board 7 and the sound insulating material 8. The sound insulating membrane 16 is extended frontward from a convex distal end 15a of the flexible front portion 15 to be brought into close contact with the wire harness 6, and cooperates with the small-diameter tubular portion 11, the flange 12, the large-diameter tubular portion 13, and the flexible front portion 15 to define an annular air spaces (third annular space) for soundproofing. The spare tubular portions 17 and 18 are projected integrally on the flange 12 within the large-diameter tubular portion 13. The small-diameter tubular portion 11, the flange 12, the large-diameter tubular portion 13, and the like are integrally molded with an elastic material such as rubber.

As shown in FIGS. 1 and 3, the small-diameter tubular portion 11 has a substantially conical tubular shape (trumpet shape) diverging frontward. The diameter of the front part 11a of the small-diameter tubular portion 11 is larger than that of the rear part 11b. The wire harness 6 passed through the small-diameter tubular portion 11 is held therein without a gap therebetween by means of adhesive tape Ta bound on the outer circumference of the small-diameter tubular portion 11. An annular tape stopper 11c is projected integrally on the rear part 11b of the outside of the small-diameter tubular portion 11.

On a periphery of a through hole 7a of the panel board 7 for a vehicle, an edge portion 7b extends rearward and is formed to be perpendicular to the rear face 7c of the panel board 7. The large-diameter tubular portion 13 has an annular concave fitting groove 13d to be fitted to the edge portion 7b of the through hole 7a on its outer circumference 13c. The lip portion 14 extended from the rear part 13a of the large-diameter tubular portion 13 is formed to have a section of a reverse V shape (conical shape diverging frontward). A distal end 14a thereof is brought into close contact with the rear face 7c of the panel board 7. The lip portion 14, a sidewall of the fitting groove 13d at the rear part of the large-diameter tubular portion 13, and the rear face 7c of the panel board 7 cooperate to define a first annular sealed air space Q (first annular space). The lip portion 14 is positioned outside an outermost part of the annular groove surface, which is, in this embodiment, an inner circumference 8b of the opening 8a in the sound insulating material 8 of the panel hole. That is, the lip portion 14 is lapped over the sound insulating material 8 by a length L.

The flexible front portion 15 is extended to the opening 8a of the sound insulating material 8 superimposed on the front face 7d of the panel board 7. Specifically, the flexible front portion 15 is extended so as to be curved inward (toward the wire harness 6) in a shape converging frontward. The convex distal end 15a thereof is brought into close contact with the rearward facing part of the skin 9 superimposed on the sound insulating material 8. The flexible front portion 15, the inner circumference 8b of the opening 8a of the sound insulating material 8, the skin 9 and the front face 7d of the panel board 7 define a second annular sealed air space R (second annular space).

As shown in FIGS. 1 to 3, the sound insulating membrane 16 includes a folded portion 16a and a wire holding tubular portion 16b. The folded portion 16a is folded inward from the convex distal end 15a of the flexible front portion 15 so as to have a section of a reversed U shape. The wire holding tubular portion 16b is extended from the folded portion 16a to be brought into close contact with the wire harness 6, and has an inner surface of a substantially conical tubular shape converging frontward. An opening end 16c of the wire holding tubular portion 16b is formed to be reduced in diameter so as to have a diameter smaller than the outer diameter of the wire harness 6. The opening end 16c is pressed against the wire harness 6 passed therethrough without a gap therebetween by binding adhesive tape Tb on the outer circumference of the wire holding tubular portion 16b. Accordingly, the wire harness 6 is held in the wire holding tubular portion 16b without a gap therebetween. The small-diameter tubular portion 11, the flange 12, the large-diameter tubular portion 13, the flexible front portion 15, and the sound insulating membrane 16 define an annular air space S for soundproofing. As shown in FIG. 2, on the outer circumference of the flexible front portion 15, a plurality of concave portions 19 are formed at even intervals to lower an insertion force.

As shown in FIGS. 1 to 3, the spare tubular portions 17 and 18 for options, each having a cylindrical shape, are disposed inside the large-diameter tubular portion 13 and the flexible front portion 15. As shown in FIG. 2, a hood lock cable (not shown) is passed through the spare tubular portion 17 of a short length to be held. The short spare tubular portion 17 is closed on its rear end by a cover (not shown). On a front end of the spare tubular portion 17, a front end opening 17b is provided. The cover potion on the rear end of the spare tubular portion 17 is cut to be opened for a use when an option is adopted.

Furthermore, as shown in FIGS. 1 to 3, a washer hose (not shown), wires for a fog light, or the like is passed through each spare tubular portion 18 of a long length to be held. Each spare tubular portion 18 is closed on its rear end by a cover 18a. On a front end of each spare tubular portion 18, a front end opening 18b is provided. The cover 18a on the rear end of each spare tubular portion 18 is cut to be opened for a use when an option is adopted.

According to the grommet 10 of the above described embodiment, as shown in FIGS. 2 and 3, the wire harness 6 is allowed to pass through the cylindrical small-diameter tubular portion 11 and the cylindrical wire holding tubular portion 16b of the sound insulating membrane 16. Then, the adhesive tape Ta is bound on the outer circumference of the small-diameter tubular portion 11, so that the wire harness 6 is held therein without a gap therebetween. Moreover, the adhesive tape Tb is bound on the outer circumference of the wire holding tubular portion 16b, so that the wire harness 6 is held in the wire holding tubular portion 16b without a gap therebetween. Accordingly, the small-diameter tubular portion 11, the flange 12, the large-diameter tubular portion 13, the flexible front portion 15, and the sound insulating membrane 16 define the annular air space S for soundproofing. The annular air space S for soundproofing surely prevents noise from being transmitted from an engine compartment E to a passenger compartment C via the grommet 10.

In a state where the wire harness 6 is passed through the grommet, as shown in FIG. 3, the flexible front portion 15, which is extended from the front part 13b of the large-diameter tubular portion 13 of the grommet 10 so as to be curved inward, is pressed to be inserted in the through hole 7a of the panel board 7 from the passenger compartment C side. Accordingly, the fitting groove 13d of the large-diameter tubular portion 13 is fitted to the edge portion 7b of the through hole 7a of the panel board 7, and the distal end 14a of the lip portion 14 on the rear part 13a of the large-diameter tubular portion 13 is brought into close contact with the rear face 7c of the panel board 7. Moreover, the convex distal end 15a of the flexible front portion 15 on the front part 13b of the large-diameter tubular portion 13 is brought into close contact with the skin 9 of the sound insulating material 8.

Accordingly, the grommet 10 can be easily attached to the panel board 7. The lip portion 14, the sidewall of the fitting groove 13d at the rear part of the large-diameter tubular portion 13, and the rear face 7c of the panel board 7 define the first annular sealed air space Q. The flexible front portion 15, the inner circumference Bb of the opening Ba of the sound insulating material 8, the skin 9, and the front face 7d of the panel board 7 define the second annular sealed air space R. These two sealed annular air spaces Q and R improve sound insulation.

The lip portion 14 on the rear part 13a of the large-diameter tubular portion 13 is formed so as to be positioned outside the inner circumference Bb of the opening 8a of the sound insulating material 8. Therefore, the first annular sealed air space Q and the sound insulating material 8 are disposed so as to overlap each other, and the sound insulation is further improved.

In the above-described embodiment, description has been made on the soundproof grommet attached to the panel for a vehicle. However, one to which the grommet is attached is not limited to the panel for a vehicle.

Although only one embodiment of the invention have been disclosed and described, it is apparent that the other embodiments and modification of the invention are possible.

What is claimed is:

1. A grommet to be fitted in a panel hole of a panel with an insulation material thereon, the panel provided with a panel face and an annular groove on an inner circumference of the panel hole, the grommet comprising:
   a first tubular portion holding a wire therein;
   a flange formed on a front part of the first tubular portion;
   a second tubular portion extending frontward from the flange;
   a flexible front portion extending from a front part of the second tubular portion in a shape converging frontward, the flexible front portion being integrally connected to the second tubular portion;
   a lip portion formed on a rear part of the second tubular portion;
   a third tubular portion extending frontward from the flexible front portion; and
   a groove, the groove being formed at a region of the grommet where the flexible front portion connects to the second tubular portion and an opening the groove is oriented away from the wire in a radial direction of the grommet.

2. The grommet according to claim 1, wherein the lip portion is configured to be positioned outside an outermost part of the second tubular portion.

3. The grommet according to claim 1, wherein the lip portion has a conical shape diverging frontward.

4. The grommet according to claim 1, wherein the first tubular portion has a conical shape diverging frontward.

5. The grommet according to claim 1, wherein the third tubular portion has an inner face of a conical tubular shape converging frontward.

6. The grommet according to claim 1, wherein the first tubular portion, the flange, the second tubular portion, the flexible front portion, and the third tubular portion define an annular space around the wire.

7. A grommet, comprising:
   a first tubular portion holding a first portion of a wire therein;
   a flange formed on a front part of the first tubular portion;
   a second tubular portion extending frontward from the flange;
   a flexible front portion extending from a front part of the second tubular portion in a shape converging frontward;
   a lip portion formed on a rear part of the second tubular portion; and
   a third tubular portion extending frontward from the flexible front portion, the third tubular portion further comprises a frustoconical tubular portion having a distal base disposed frontward from a proximal base thereof, the proximal base forming the distal extremity of the grommet and holding a second portion of the wire in the grommet.

8. A grommet having a distal extremity disposed frontward from a proximal extremity, the grommet comprising:
   a first frustoconical tubular portion having a first base and a second base, the first base forming the proximal extremity of the grommet and being configured to hold a first portion of a wire therein;
   a flange formed on the second base of the first frustoconical tubular portion;
   a first tubular portion extending frontward from the flange;
   a flexible front portion extending from a front part of the first tubular portion in a shape converging frontward;
   a lip portion formed on a rear part of the first tubular portion; and
   a second frustoconical tubular portion extending frontward from the flexible front portion and having a distal base being disposed frontward from a proximal base of the second frustoconical tubular portion, wherein the distal base of the second frustoconical tubular portion forms the distal extremity of the grommet to hold a second portion of the wire therein.

9. A grommet to be fitted in a panel hole of a panel with an insulation material thereon, the grommet having a distal extremity disposed frontward from a proximal extremity and the panel provided with a panel face and an annular groove on an inner circumference of the panel hole, the grommet comprising:
   a first frustoconical tubular portion having a first base and a second base, the first base forming the proximal extremity of the grommet and being configured to hold a first portion of a wire therein;
   a flange formed on the second base of the first frustoconical tubular portion;
   a first tubular portion extending frontward from the flange, the first tubular portion to be fitted in the panel hole;
   a flexible front portion extending from a front part of the first tubular portion in a shape converging frontward;
   a lip portion formed on a rear part of the first tubular portion; and
   a second tubular portion extending frontward from the flexible front portion,
   wherein the lip portion is configured to come into contact with the panel face to define a first annular space cooperating with the rear part of the first tubular portion and the panel face, and the flexible front portion is configured to come into contact with a rearward facing part of an annular groove surface to define a second annular space cooperating with the annular groove surface, as the grommet is fitted in the panel hole.

10. A combination of a grommet and a panel, the combination comprising:
   the panel comprising a first face, a second face, an insulation material between the first and second faces, a hole to receive the grommet, and an annular groove formed by a recess in the insulation material with respect to the hole; and
   the grommet comprising:
   a first tubular portion holding a wire therein;
   a flange formed on a front part of the first tubular portion;
   a second tubular portion extending frontward from the flange, the second tubular portion being configured to be fitted in the hole;
   a flexible front portion extending from a front part of the second tubular portion in a shape converging frontward;
   a lip portion formed on a rear part of the second tubular portion; and
   a third tubular portion extending frontward from the flexible front portion,
   wherein, as the grommet is fitted in the panel hole, the lip portion is configured to come into contact with the first face of the panel to define a first annular space cooperating with the rear part of the second tubular portion and the first face, and the flexible front portion is configured to come into contact with a rearward facing part of a surface of the annular groove to define a second annular space cooperating with the surface of the annular groove.

* * * * *